United States Patent [19]

Whistler, III et al.

[11] Patent Number: 5,356,252
[45] Date of Patent: Oct. 18, 1994

[54] UNITIZED EXPANDING DOWEL

[75] Inventors: Lawrence V. Whistler, III, East Amherst; Raymond J. Hutten, Tonawanda, both of N.Y.

[73] Assignee: S.B. Whistler & Sons, Inc., Akron, N.Y.

[21] Appl. No.: 102,836

[22] Filed: Aug. 6, 1993

[51] Int. Cl.⁵ ............................................ F16B 13/06
[52] U.S. Cl. ................................ 411/45; 411/55; 411/60
[58] Field of Search ................ 411/45, 54, 55, 57, 411/58, 60, 61, 271, 324, 62

[56] References Cited

U.S. PATENT DOCUMENTS

| | | |
|---|---|---|
| 80,560 | 8/1868 | Nagle . |
| 2,100,873 | 11/1937 | Roberts ............................. 411/58 |
| 2,321,170 | 6/1943 | Wallace ............................. 411/60 |
| 2,384,918 | 9/1945 | Houk ............................. 411/60 X |
| 2,901,787 | 9/1959 | Whistler, Sr et al. ................. 20/92 |
| 3,603,626 | 9/1971 | Whiteside ..................... 411/60 X |
| 4,147,444 | 4/1979 | Herb et al. ....................... 403/313 |
| 4,447,183 | 5/1984 | Yunt ................................. 411/57 |
| 4,449,877 | 5/1984 | Kessler ............................ 411/57 |
| 4,496,259 | 1/1985 | Foucher ......................... 411/55 X |
| 4,799,841 | 1/1989 | Ramsbro ......................... 411/60 X |
| 4,909,657 | 3/1990 | Maechtle et al. ................... 403/290 |
| 4,976,577 | 12/1990 | Brown et al. ..................... 411/271 |
| 5,023,990 | 6/1991 | Lee, II et al. ...................... 29/525.1 |

Primary Examiner—Neill R. Wilson
Attorney, Agent, or Firm—Bean, Kauffman & Spencer

[57] ABSTRACT

A unitized expanding dowel is disclosed for accurately and repeatably locating a part having a through hole relative to a reference part having a hole of like size. The dowel includes a radially expandable, resiliently deformable cylindrical sleeve having an axial passage therethrough. A portion of the passage is frusto-conically shaped to complement a tapered expansion pin movable within the axial passage in a first axial direction to force the outer surface of the sleeve to radially expand into tight surface engagement with inner surfaces of the holes. Coupling means connect the sleeve to the expansion pin and permit movement of the pin in an opposite direction to allow contraction of the sleeve away from tight engagement with the holes while preventing withdrawal of the pin from the sleeve passage.

9 Claims, 2 Drawing Sheets

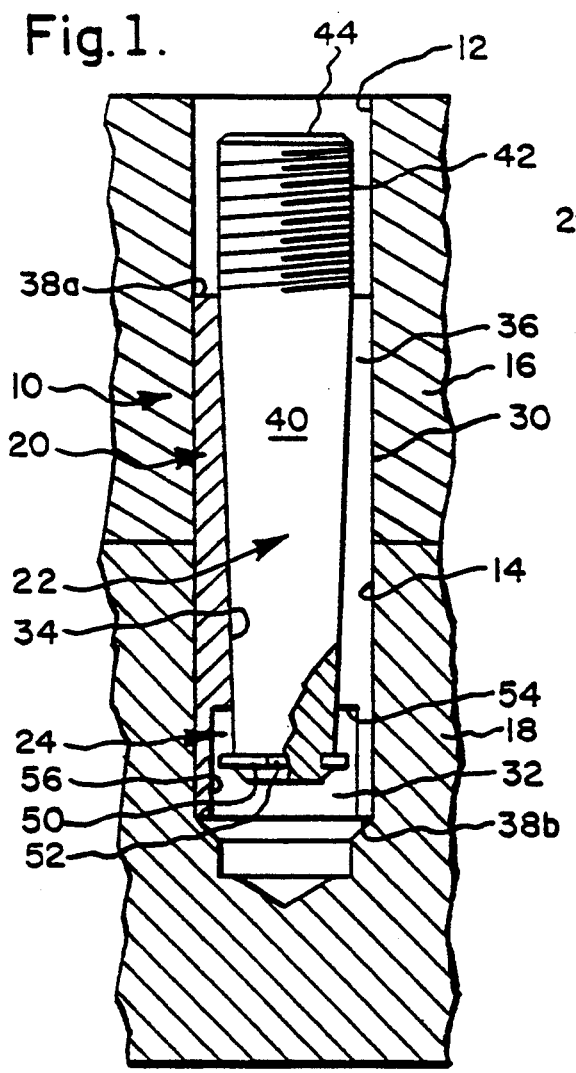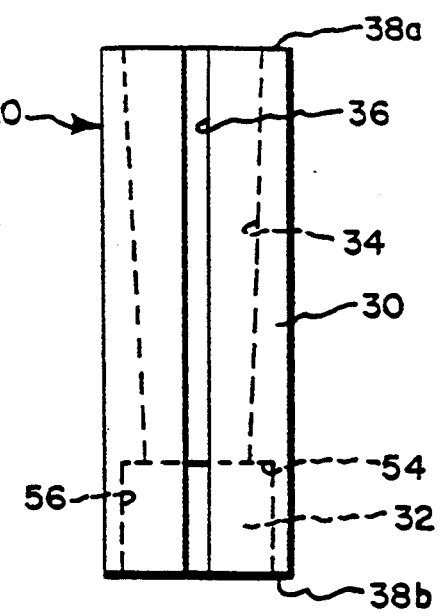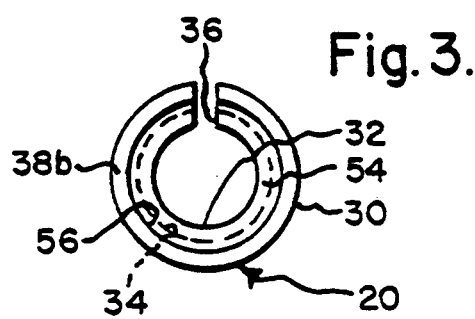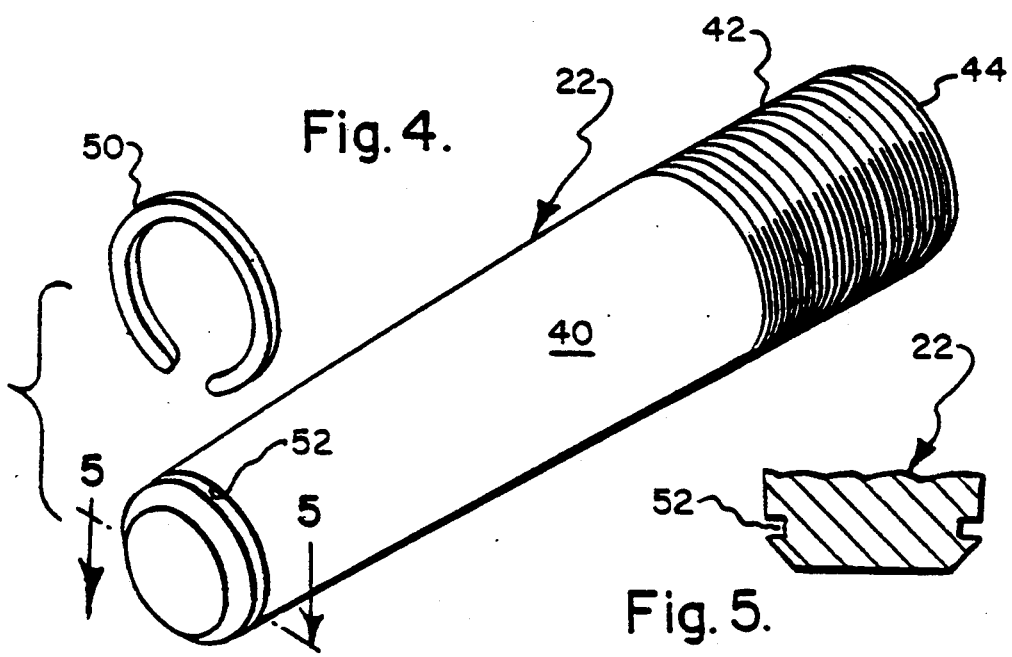

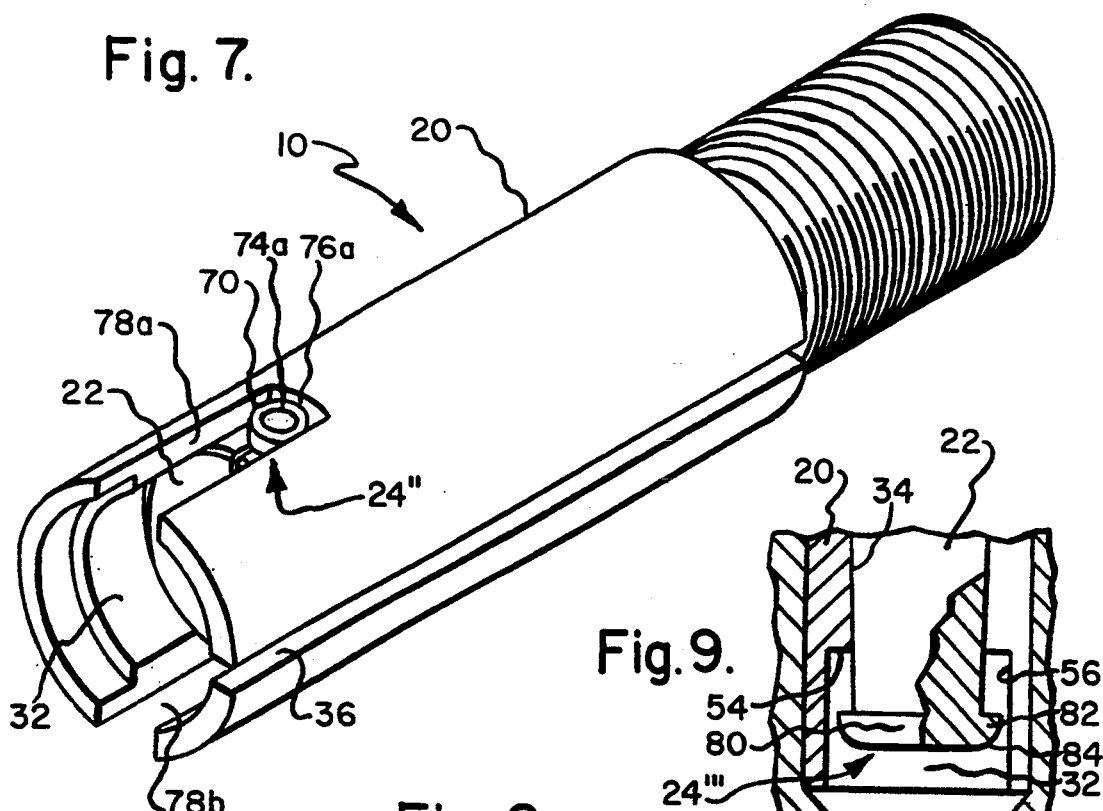

UNITIZED EXPANDING DOWEL

BACKGROUND OF THE INVENTION

This invention relates to improvements in expanding dowels of the type used in accurately and repeatably locating a first part with respect to a second or reference part, and, more particularly, to a dowel having a tapered expansion pin slidably within an expandable sleeve such that the sleeve may be removably retained within aligned openings or holes provided in the parts in order to retain the parts assembled as a unit.

It is known to use expandable dowels to locate a first part or workpiece having a through hole relative to a second or reference part, for instance a fixture, having a locating hole. Commonly assigned U.S. Pat. No. 2,901,787 issued on Sep. 1, 1959 discloses a dowel having a generally cylindrical sleeve formed of resiliently deformable material and provided with a tapered axial bore and a slot extending the length of the sleeve wall to permit radial expansion and contraction of the sleeve. Once the sleeve has been inserted into axially aligned holes in the workpiece and reference part, an expansion pin having an outer surface tapered to complement the sleeve bore is driven into the sleeve bore, for instance by striking a punch engaged with an exposed end of the expansion pin with a hammer or mallet sufficiently to force an outer surface of the sleeve to expand into secure surface-to-surface frictional clamping engagement with inner surfaces of the holes to effect alignment of such holes and assembly of the workpiece and reference part as a unit.

Subsequent removal of the dowel is generally carried out in a two-step procedure. First, an internally threaded pull nut or extractor is screwed onto a threaded extension of the expansion pin sufficiently to successively seat the pull nut on an outer end of the sleeve and then to withdraw the expansion pin from the sleeve in order to allow the sleeve to contract. Second, the sleeve is removed from the holes, and where the hole in the reference part is a blind hole, it is necessary to use an insertable sleeve puller designed to hook into a recess in the sleeve to pull the sleeve from the holes.

There are several recognized disadvantages associated with prior art dowels of the type described above. Such dowels require a separate tool, i.e. the sleeve puller, for the second removal step to completely remove the dowel from a blind hole. Consequently, time must be expended by a machinist in locating a sleeve puller and using it to remove a sleeve or plurality of sleeves from the holes. A further disadvantage is that the uncoupled sleeve and expansion pin may easily become separated and misplaced from each other, resulting in additional time being spent by a user in finding a matching-sized sleeve and expansion pin.

SUMMARY OF THE INVENTION

The present invention is generally directed to a unitized expansion dowel having a sleeve and an expansion pin which are permanently coupled together by coupling means such that the entire dowel may be inserted into or removed from locating holes in a part and a reference part in a single step.

In accordance with the present invention, a resiliently deformable, radially expandable cylindrical sleeve is provided having an axial passage extending therethrough. A segment of the axial passage is tapered to form a frusto-conically shaped inner surface portion. An expansion pin slidably resides within the passage and is tapered to form a frusto-conical outer surface portion which is complementary to the tapered inner surface portion of the sleeve. Movement of the expansion pin in a first direction relative to the sleeve causes the outer surface portion of the expansion pin to engage the inner surface portion of the sleeve, thereby forcing the sleeve to expand in a radial direction such that the cylindrical outer surface of the sleeve is forced into tight engagement with the inner surfaces of the locating holes.

Movement of the expansion pin in a second or opposite withdrawal direction, such as by means of an internally threaded pull nut or extractor, disengages the outer surface portion of the expansion pin from the inner surface portion of the sleeve, thereby allowing the sleeve to contract and move from tight engagement with the inner surfaces of the holes.

The sleeve and expansion pin are permanently joined or coupled together by coupling means, which allows sufficient movement of the expansion pin in the first and second directions as required to effect desired expansion and contraction of the sleeve, while constraining the expansion pin against withdrawal from within the sleeve incident to movement of the expansion pin in the second direction. In accordance with a preferred embodiment of the invention, the coupling means includes an inner stop or abutment surface defined by the passage of the sleeve and a C-shaped clip carried within an annular groove formed in the expansion pin, wherein the stop surface and clip are arranged for engagement incident to movement of the expansion pin in the second or withdrawal direction.

Further embodiments of the invention utilize alternatives to the C-shaped clip and/or the stop surface. In a second embodiment, a cross-pin sits within a cross-hole extending transversely through the expansion pin and has opposite ends extending radially from the expansion pin to engage with the stop surface. In a third embodiment, a pair of diametrically opposed, axially extending slots in the sleeve have closed ends arranged to be engaged by opposite ends of a cross-pin. In a fourth embodiment, an abutment head is integrally formed with the expansion pin and is provided with a radially enlarged annular rim arranged to engage with the stop surface. In a fifth embodiment, an abutment head having a radially enlarged annular rim arranged to engage with the stop surface is separately formed and mounted on the expansion pin by a stem inserted within an axial hole provided in the expansion pin.

BRIEF DESCRIPTION OF THE DRAWINGS

The nature and mode of the present invention will now be more fully described in the following detailed description taken with the accompanying drawings wherein:

FIG. 1 is a sectional view showing a dowel formed in accordance with a preferred embodiment of the present invention and as serving to retain a pair of parts assembled as a unit;

FIG. 2 is a side elevational view of a sleeve of the dowel;

FIG. 3 is an end view of the sleeve;

FIG. 4 is an exploded perspective view of an expansion pin of the dowel and a C-shaped clip intended to be carried by the expansion pin;

FIG. 5 is a sectional view taken generally along line 5—5 in FIG. 4;

FIG. 6 is a partial sectional view of a dowel formed in accordance with a second embodiment of the present invention;

FIG. 7 is a perspective view of a dowel formed in accordance with a third embodiment of the present invention;

FIG. 8 is an end view of the dowel shown in FIG. 7;

FIG. 9 is a partial sectional view of a dowel formed in accordance with a fourth embodiment of the present invention; and FIG. 10 is a partial sectional view of a dowel formed in accordance with a fifth embodiment of the present invention.

DETAILED DESCRIPTION

Reference is first made to FIG. 1, wherein a dowel formed according to a preferred embodiment of the present invention and designated generally as 10 is shown as being arranged in an expanded or doweling state within like-sized, cylindrical locating holes 12 and 14 formed in a first part or workpiece 16 and a second or reference part, such as a fixture, 18, respectively, for purposes of releasably retaining these parts assembled as a unit with their locating holes disposed in axial alignment. In a typical installation, locating hole 14 is a blind bore opening, and part 16 is of one-piece construction.

Dowel 10 generally comprises a resiliently deformable, radially expandable sleeve 20, a tapered expansion pin 22 for expanding the sleeve, and coupling means designated generally as 24 for connecting or coupling the sleeve and the expansion pin.

Sleeve 20 is shown in FIGS. 2 and 3 as having a generally cylindrical outer surface 30 and an axial passage 32, which is arranged to extend lengthwise of the sleeve and includes a frusto-conically shaped inner surface portion 34. An expansion slot 36 is provided to extend radially from passage 32 through outer surface 30 and lengthwise of the sleeve to enable radial expansion and contraction of the sleeve. Outer surface 30 and passage 32 are connected adjacent outer and inner ends of sleeve 20 by generally C-shaped radially extending surfaces 38a and 38b. Sleeve 20 is fabricated such that when not deformed, the diameter of outer surface 30 is sufficiently small to allow the sleeve to be freely slidably received within holes 12 and 14. Sleeve 20 may be formed of any suitable resiliently deformable material which permits return of the sleeve to its undeformed state after removal from inner surface portion 34 of an expansion force in an amount sufficient to expand the sleeve to position outer surface 30 in tight fitting surface-to-surface frictional engagement with the cylindrical surfaces of holes 12 and 14. The length of sleeve 20 is preferably selected to substantially traverse the combined lengths of holes 12 and 14.

Expansion pin 22 is slidably receivable within passage 32 and includes a frusto-conically shaped outer surface portion 40 which is tapered to complement the inner surface portion 34 of the sleeve. Expansion pin 22 is preferably provided at its outer end with an externally threaded extension 42 terminating in a striking or force applying surface 44.

In a first preferred embodiment shown in FIG. 1, coupling means 24 includes a C-shaped clip 50 snap-fitted within an annular groove 52 formed adjacent an inner or inserted end of expansion pin 22, and an inner annular stop or abutment surface 54 formed by providing a stepped enlargement or bore 56 adjacent the inner end of passage 32. It will be understood that the outside diameter of clip 50 is sufficiently small to allow for clearance between the clip and enlargement 56 to prevent frictional resistance to axially directed movement of expansion pin 22.

Setting of dowel 10 is generally carried out in conventional fashion by slidably inserting the undeformed or contracted dowel into locating holes 12 and 14 when the holes are axially aligned sufficiently to permit insertion of the dowel. Once dowel 10 is within holes 12 and 14, expansion pin 22 is forced to move in a first axial direction within passage 32, for example by using a hammer to tap a punch (not shown) engaged with striking surface 44 of the expansion pin, which causes the outer surface portion 40 of the expansion pin to cooperate in a surface-to-surface, wedge-like manner with complementary inner surface portion 34 of the sleeve to force the outer surface 30 of the sleeve to expand radially outward into frictionally secure engagement with the inner surfaces of locating holes 12 and 14, and thereby effect alignment of such holes.

Removal of dowel 10 from locating holes 12 and 14 is carried out by moving expansion pin 22 in an axial withdrawal direction opposite the first or setting direction, for example by screwing an internally threaded pull nut or extractor (not shown) of the type described in U.S. Pat. No. 2,901,787 onto the threaded extension 42 of the expansion pin until the nut becomes seated on an outside end 38a of the sleeve, and then turning the pull nut further to effect movement of the expansion pin in the withdrawal direction. As expansion pin 22 is moved in the withdrawal direction, the outer surface portion 40 of the expansion pin is first removed from camming engagement with the inner surface portion 34 of the sleeve, thereby permitting the outer surface 30 of the sleeve to be resiliently retracted from engagement with the inner surfaces of locating holes 12 and 14. As expansion pin 22 is moved further in the withdrawal direction, clip 50 is placed in under engagement with annular stop surface 54 and then serves to lift sleeve 20 for withdrawal from locating holes 12 and 14 with the expansion pin.

FIG. 6 illustrates a second embodiment of the present invention which utilizes alternative coupling means 24', wherein a cross-pin 60 is disposed to extend transversely through expansion pin 22 and generally performs the function of the C-shaped clip 50 of the first embodiment. Cross-pin 60, which may simply be a suitably sized roll pin, is held within a transverse cross-hole 62 in expansion pin 22 and is sufficiently long such that opposite ends 64a and 64b of the cross-pin protrude radially outward from the expansion pin for abutment against the stop surface 54 incident to movement of the expansion pin in the withdrawal direction. The length of cross-pin 60 is limited to allow for clearance between ends 64a and 64b and enlargement 56. During assembly of dowel 10, cross-pin 60 is inserted through the expansion slot 36 in sleeve 20 and into cross-hole 62 after expansion pin 22 has been inserted within the sleeve, hence the diameter of cross-pin 60 must be smaller than the width of expansion slot In a third embodiment of the present invention, shown in FIGS. 7 and 8, coupling means 24', comprises a cross-pin 70, which is generally similar to the cross-pin 60 of the previous embodiment and extends transversely through expansion pin within a cross-hole 72. Cross-pin 70 has a pair of opposite ends 74a and 74b which protrude radially outward from expansion pin 22 for respective abutment with a pair of closed ends 76a and 76b provided in axially extending, diametrically opposed travel slots 78a and 78b, respectively, incident to movement of the expansion pin in the withdrawal direction. Travel slots 78a and 78b open radially through sleeve 20 from passage 32 through outer surface 30 to accommodate cross-pin ends 74a and 74b, respectively, and extend axially so as not to limit movement of expansion pin 22 in the first direction. In this construction, the dowel is assembled by sliding expansion pin 22 within sleeve 20 and subsequently inserting the cross-pin 70 through either travel slot 78a or 78b and into cross-hole 72.

FIG. 9 illustrates a fourth embodiment of the present invention, wherein coupling means 24''' comprises an abutment head 80 integrally formed with an end of expansion pin 22 and having a radially enlarged annular rim 82 arranged to engage with stop surface 54 incident to movement of the expansion pin in the withdrawal direction to prevent withdrawal of the expansion pin from sleeve 20. Rim 82 is provided with a rounded annular leading edge 84 to facilitate assembly of dowel 10, which requires that the abutment head 80 be forced inwardly through passage 32 passed stop surface 54.

A fifth embodiment of the present invention, shown in FIG. 10, utilizes coupling means 24'''' comprising an insert pin 90 having an abutment head 92 and an elongated stem 94. Abutment head 92 has a radially enlarged annular rim 96 arranged to engage with stop surface 54, as expansion pin 22 is moved in the withdrawal direction. Elongated stem 94 is permanently held within an axially extending recess 98 in expansion pin 22 by welding, brazing, threaded engagement, or the like, subsequent to insertion of the expansion pin within sleeve 20.

What is claimed is:

1. A unitized expanding dowel for locating and aligning a first part having a through-hole relative to a second part having a hole of the same inside diameter as said through-hole, said dowel comprising:
   a resiliently deformable sleeve having a generally cylindrical outer surface and an axially extending passage, said passage having a frusto-conically shaped inner surface portion, said sleeve being uniformly radially expandable over its entire length and insertable in a first direction within said through hole and said hole;
   an expansion pin slidably receivable within said passage and having a frusto-conically shaped outer surface portion at least as long as said inner surface portion and complementary in taper to said inner surface portion, said pin being movable within said passage in said first direction to move said outer surface portion into surface-to-surface engagement with said inner surface portion for radially expanding said sleeve uniformly over its entire length and moving said outer surface into tight engagement with said holes and in an opposite direction to remove said outer surface portion from surface-to-surface engagement with said inner surface portion for permitting resilient contraction of said sleeve to remove said outer surface from tight engagement with said holes; and
   coupling means for connecting said sleeve to said pin to permit movement of said pin in said opposite direction while preventing withdrawal of said pin from within said passage.

2. A dowel according to claim 1, wherein said coupling means comprises an inner stop surface defined by said passage and a substantially C-shaped clip attached to said pin and arranged to removably engage with said inner stop surface incident to movement of said pin in said opposite direction.

3. A dowel according to claim 1, wherein said coupling means comprises an inner stop surface defined by said passage and a cross-pin extending transversely of said pin and extending radially outward therefrom for engagement with said inner stop surface incident to movement of said pin in said opposite direction.

4. A dowel according to claim 1, wherein said coupling means includes a pair of diametrically opposed, axially extending slots formed in said sleeve and opening radially from said passage through said outer surface, each of said pair of slots having a closed end, and a cross-pin extending transversely of said pin and being arranged to engage with said closed ends incident to movement of said pin in said opposite direction.

5. A dowel according to claim 1, wherein said coupling means comprises an inner stop surface defined by said passage and an enlarged abutment portion integrally formed with said pin for engagement with said inner stop surface incident to movement of said pin in said opposite direction.

6. A dowel according to claim 1, wherein said coupling means comprises an inner stop surface defined by said passage and an elongated insert pin held within an axial recess in said pin, said insert pin having an enlarged abutment head extending from said axial hole for engagement with said inner stop surface incident to movement of said pin in said opposite direction.

7. A dowel according to claim 1, wherein said sleeve includes a single slot therethrough extending axially the entire length of said sleeve for permitting uniform radial expansion of said sleeve.

8. A dowel according to claim 1, wherein said pin includes an externally threaded outer end for use in moving said pin in said opposite direction, said outer end terminating in a striking surface for use in moving said pin in said first direction.

9. In a dowel for use in locating first and second parts, wherein said first and second parts have first and second openings, respectively, of like diameter intended to be disposed in axial alignment, said dowel including a sleeve resiliently deformable between a contracted state, wherein it is sized to be removably, slidably inserted in a first direction successively through said first opening and into said second opening, and an expanded state, wherein an outer surface of said sleeve is sized to be disposed for frictional surface-to-surface engagement with said first and second openings to maintain said openings in axial alignment and constrain said sleeve against movement in a second direction successively out of said second and first openings, and a pin movable axially within said sleeve in said first direction for expanding said sleeve into said expanded state and in said second direction for permitting said sleeve to resiliently contract into said contracted state, said pin having an outer end for use in alternatively moving said pin relative to said sleeve in said first and second directions, the improvement comprising:
   means for coupling said pin to said sleeve to form a unitary construction, wherein said pin is movable relative to said sleeve in said second direction sufficiently to permit said sleeve to resiliently contract into said contracted state, while preventing withdrawal of said pin from within said sleeve, said pin including thread means accessible through said first opening for use in moving said pin in said second direction.

* * * * *

UNITED STATES PATENT AND TRADEMARK OFFICE
CERTIFICATE OF CORRECTION

PATENT NO. : 5,356,252
DATED : October 18, 1994
INVENTOR(S) : Lawrence V. Whistler, III et al.

It is certified that error appears in the above-identified patent and that said Letters Patent is hereby corrected as shown below:

Col. 4, Line 62 - after "expansion slot", insert --36.--.

Col. 4, Line 64 - " 24' " should be --24"--.

Col. 5, Line 26 - " 24''' " should be --24''''--.

Signed and Sealed this

Fourteenth Day of January, 1997

Attest:

BRUCE LEHMAN

*Attesting Officer*  *Commissioner of Patents and Trademarks*